United States Patent
Lidron

(10) Patent No.: US 8,208,915 B2
(45) Date of Patent: Jun. 26, 2012

(54) METHOD FOR CONTROLLING THE OPERATION OF THE CELLS OF A CELLULAR COMMUNICATION SYSTEM

(75) Inventor: Claudio Lidron, Padua (IT)

(73) Assignees: Vodafone Group PLC, Newbury, Berkshire (GB); Vodafone Omnitel N.V., Amsterdam (NL)

( * ) Notice: Subject to any disclaimer, the term of this patent is extended or adjusted under 35 U.S.C. 154(b) by 413 days.

(21) Appl. No.: 12/295,247

(22) PCT Filed: Mar. 22, 2007

(86) PCT No.: PCT/IB2007/000787
§ 371 (c)(1),
(2), (4) Date: Sep. 29, 2008

(87) PCT Pub. No.: WO2007/110759
PCT Pub. Date: Oct. 4, 2007

(65) Prior Publication Data
US 2010/0234031 A1    Sep. 16, 2010

(30) Foreign Application Priority Data
Mar. 29, 2006    (IT) .............................. MI2006A0596

(51) Int. Cl.
*H04W 4/00* (2009.01)
*H04W 40/00* (2009.01)
(52) U.S. Cl. ...................................... 455/422.1; 455/446
(58) Field of Classification Search ................ 455/422.1, 455/446, 453
See application file for complete search history.

(56) References Cited

U.S. PATENT DOCUMENTS

| 6,308,071 | B1 | 10/2001 | Kalev | |
| 6,321,083 | B1 * | 11/2001 | Vaara et al. | 455/446 |
| 6,539,221 | B1 * | 3/2003 | Vasudevan et al. | 455/423 |
| 6,985,735 | B2 * | 1/2006 | Gustafsson | 455/446 |
| 7,142,868 | B1 * | 11/2006 | Broyles et al. | 455/453 |
| 2004/0185858 | A1 | 9/2004 | Fattouch et al. | |
| 2004/0203921 | A1 * | 10/2004 | Bromhead et al. | 455/456.1 |

FOREIGN PATENT DOCUMENTS

| EP | 0 927 941 | 7/1999 |
| EP | 1 351 532 | 10/2003 |

* cited by examiner

Primary Examiner — Vladimir Magloire
Assistant Examiner — Michael S Bush
(74) Attorney, Agent, or Firm — Workman Nydegger

(57) ABSTRACT

A method for controlling the operation of the cells of a cellular communication system comprising the steps of displaying a cartographic map (2) of a geographic area (3) comprising base transceiver stations ($BTS_n$), each intended to serve one or more cells ($C_{nj}$) with respective service areas ($MAP_{nj}$), associating a pair of Cartesian coordinates ($X_n, Y_n$) and a graphical element ($I_n$) to each base transceiver station ($BTS_n$), displaying such graphic element ($I_n$), selecting a base transceiver station (BTS), determining, for at least one of the cells, the amount (NUM) of traffic generated by mobile terminals (MS) registered by the selected base transceiver station (BTS) so as to obtain the real traffic distribution ($NUM_1, NUM_2, NUM_3, \ldots NUM_m$) of the cell, representing on the cartographic map (2) the real traffic distribution ($NUM_1, NUM_2, NUM_3, \ldots NUM_m$), and comparing it with the service area (MAP) of the cell (C).

13 Claims, 3 Drawing Sheets

Figure 1:
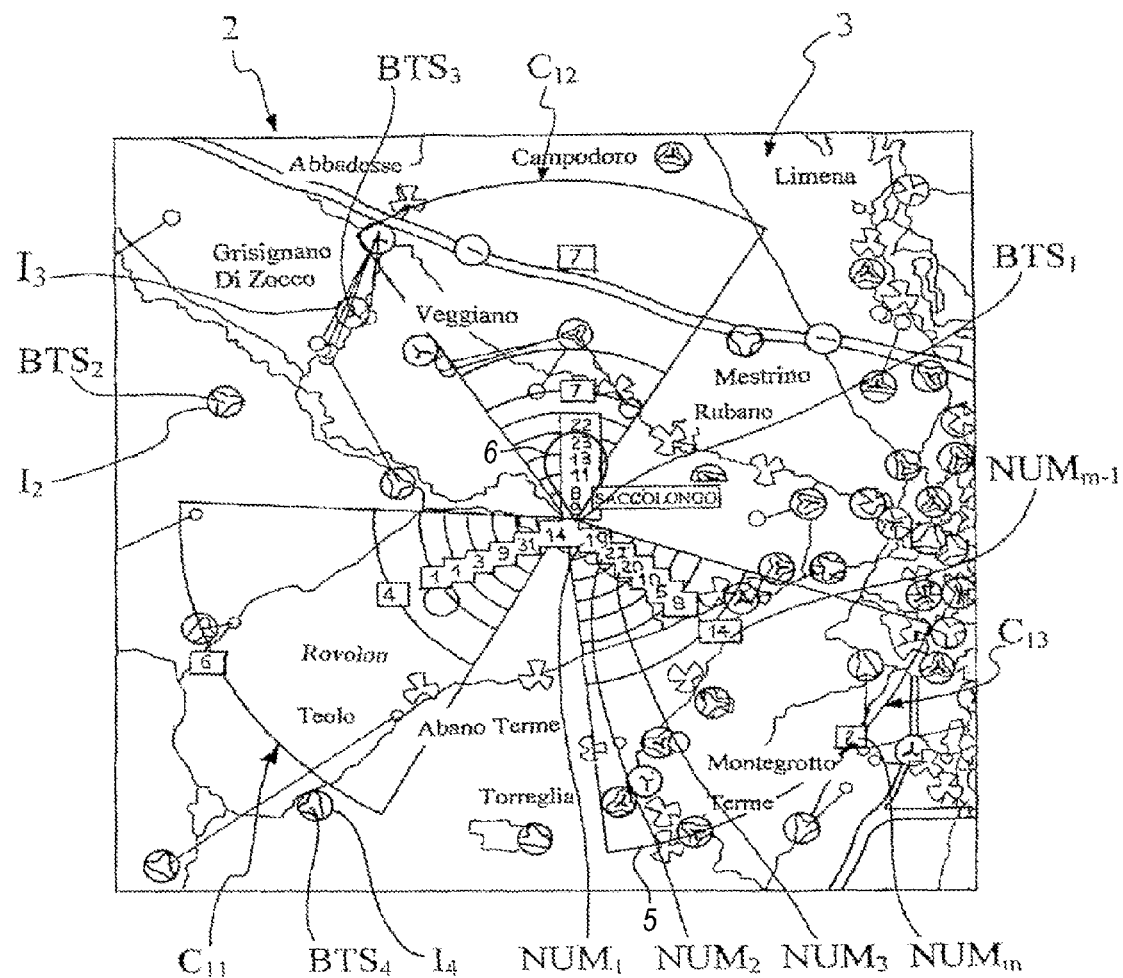

METHOD FOR CONTROLLING THE OPERATION OF THE CELLS OF A CELLULAR COMMUNICATION SYSTEM

The present invention relates to a method for controlling the operation of the cells of a cellular communication system according to the preamble of claim 1.

Specifically, the present invention can be used to control and optimize the designing of the cells of a cellular communication system.

A typical cellular communication system comprises a plurality of base transceiver stations each of which intended to serve one or more cells having their own coverage area so as to grant the coverage of the entire geographic area of competence of the communication system.

During the design phases of a cellular communication system it is necessary to define a plurality of parameters such as, for example, the position of the base transceiver stations, the typology of the cells (GSM, DCS, UMTS), the coverage area of each cell, the type of antennas to install at each base transceiver station or BTS.

When a base transceiver station is installed and put into operation, there is the problem to control its correct operation according to the design parameters in order to avoid inconveniences to users such as reduction of field values, lack of coverage, interferences in signal reception and transmission.

A method known at the state of the art to control the correct operation of a base transceiver station consists in either scheduling a series of periodic local controls at each base transceiver station or scheduling periodic controls only in case of a great number of complaints and notifications from users circulating in the coverage area of the cells served by the base transceiver station.

In this case, it is necessary to provide a technical assistance service able to directly intervene on site and make the necessary controls on the base transceiver station. Such controls consist in a series of measurements to be taken near the antennae of the base transceiver station and at preset distances from it so as to determine the correspondence between the design values and the real values registered on site.

Evidently this method implies a series of inconveniences and problems in terms of time, and therefore of costs, necessary to take the measurements and to train specialized personnel.

Furthermore, it is necessary to notice that an eventual failure of the base transceiver station of a cell can be detected by the telephone operator in case of inconveniences for the users, such as a great number of complaints in a particular coverage area, or random events, such as periodical controls of the base transceiver stations.

In both cases, the telephone operator is facing events which may compromise, at the worst also irremediably, the relationship with the customer.

Such problems are worsened by the growing number of cells and base transceiver stations of modern cellular communication systems and, at the same time, by the strong aggressiveness of rival telephone providers in terms of proposals of new and always more efficient services aiming at snatching clients from rival providers.

Consequently, there is a great need to control the operation of the cells of base transceiver stations without having to rely on the randomness of periodic assistance controls and on complaints subsequent to inconveniences to the clients due to a constant lack of coverage.

Object of the present invention is therefore to provide a method allowing to control the operation of the cells of a cellular communication system avoiding said disadvantages with reference to the known art.

This object is achieved by a method for controlling the operation of the cells of a cellular communication system according to claim 1.

Figure 2:
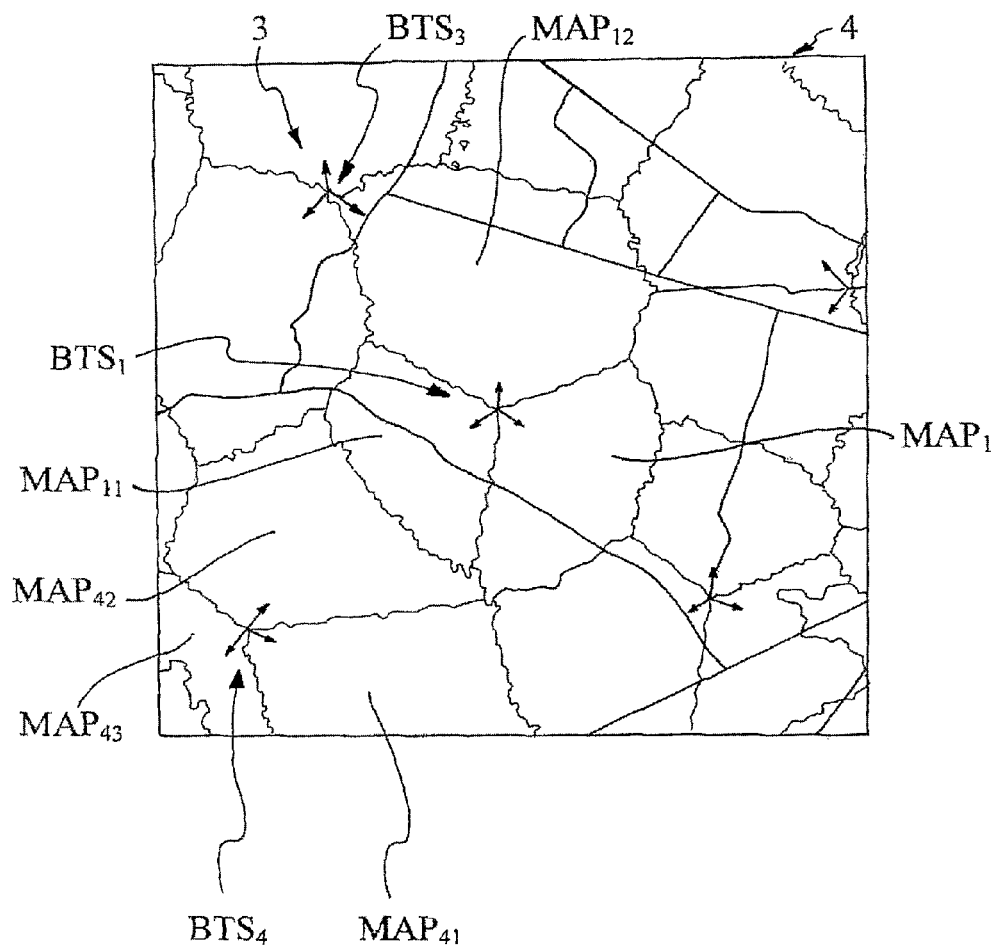
Figure 3:
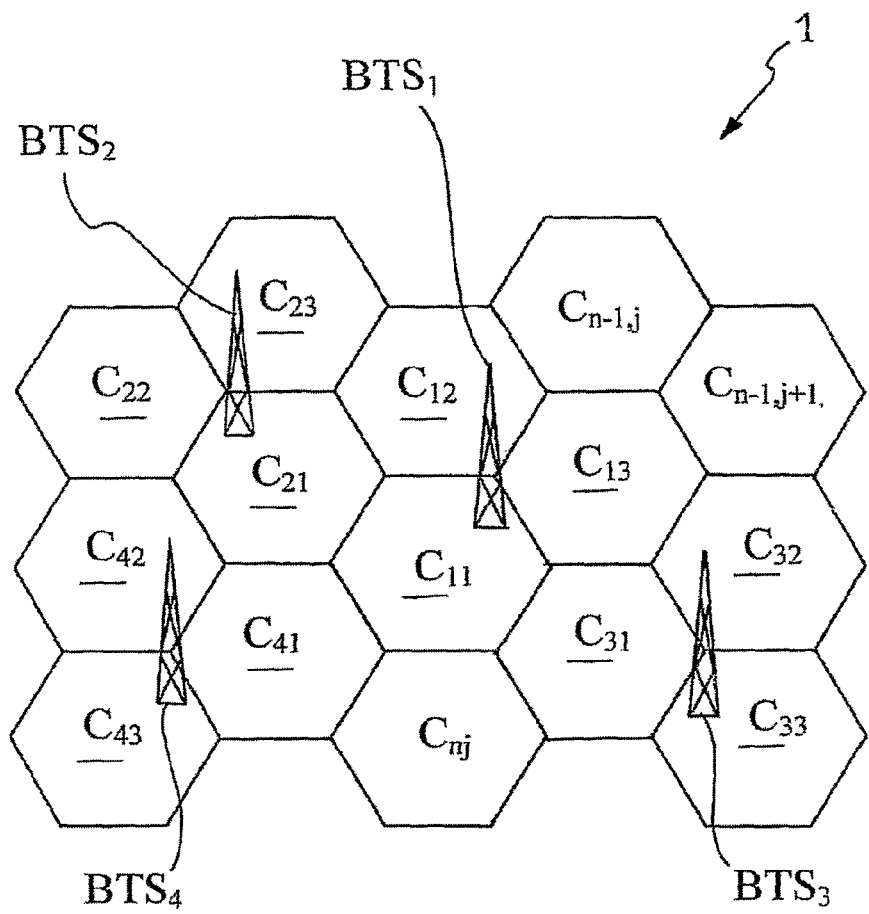

Further characteristics and the advantages of the method for controlling the operation of the cells of a cellular communication system according to the present invention will become evident by reading the following description of one preferred example of embodiment, provided as an indication and not a limit, with reference to the attached drawings, in which:

FIG. 1 is a cartographic map showing base transceiver stations, cells, and real traffic distribution according to the method of the present invention, FIG. 2 shows a best server coverage map with the service areas relative to the cells shown in the cartographic map of FIG. 1, and FIG. 3 is a schematic view of a cellular communication system having cells whose operation can be controlled by the method of the present invention.

With reference to the attached drawings, the numeral 1 typically refers to a cellular communication system covering a geographical area 3.

The area 3 comprises a plurality N of base transceiver stations $BTS_n$, with n=1 ... N, each base transceiver station $BTS_n$ being intended to serve one or more cells $C_{nj}$, with j=1 ... J where J is the number of cells served by the base transceiver station $BTS_n$, typically J=3.

Each cell $C_{nj}$ has a respective service or coverage area $MAP_{nj}$. The totality of these service areas $MAP_{nj}$ of cells $C_{nj}$ of area 3 identifies the theoretical coverage map 4, commonly called best server map, of area 3. In this case, the best server map 4 is defined by identifying, point to point within area 3, the cell $C_{nj}$ able to provide the stronger signal.

In fact, it should be noted that, although one cell could ideally provide a signal detectable also at great distances from the source i.e. from the base transceiver station, it is possible that a mobile terminal receives a stronger signal from an adjacent cell and is therefore registered by this adjacent cell.

FIG. 2 shows an example of best server map, specifically the best server map 4 of area 3 and respective service areas $MAP_{nj}$ of respective cells $C_{nj}$.

The description will continue by referring, in a non-limiting way, to a method for controlling the operation of cell $C_{13}$ of base transceiver station $BTS_1$, from now on referred to as cell C of base transceiver station BTS, for simplicity of description. Service area $MAP_{13}$ of cell $C_{13}$ will be referred to as service area MAP of cell C.

The method of the invention can be used, for example, by an operator of a telephone provider willing to control the correct operation and therefore the matching between the ideal parameters of cell C and the real operation parameters.

According to the method of the invention, a cartographic map 2 of area 3 is displayed on a screen (not shown in the attached drawings), for example the monitor of an electronic processor unit or of a portable device, or a palmtop.

The term cartographic map as used in the present invention refers to any georeferenced geographic representation in which, with conventional signs, a portion of territory or an area of interest is represented in details.

The description continues by referring, in a non-limiting way, to a cartographic map 2 of an extra-urban area, being anyway possible to produce a cartographic map of a urban, suburban area and the like.

A pair of Cartesian coordinates $X_n, Y_n$ and a graphic element $I_n$ are associated to each base transceiver station $BTS_n$.

Each pair of Cartesian coordinates $X_n, Y_n$ can be associated to the cartographic map 2 and represent the geographical position of the base transceiver station $BTS_n$ on the cartographic map 2.

According to the method of the invention, the graphic element $I_n$ of each base transceiver station $BTS_n$ matching the respective pair of Cartesian coordinates $X_n, Y_n$ is displayed on the cartographic map 2.

Advantageously, graphic elements $I_n$ of base transceiver stations $BTS_n$ are selected according to the transmission frequencies of the base transceiver stations BTS, themselves. For example, graphic elements $I_n$ can vary according to whether the base transceiver station BTS is a GSM, DCS or UMTS station.

Still Advantageously, to the graphic elements $I_n$ of base transceiver station $BTS_n$ respective colours can be associated according to the transmission frequency of the corresponding base transceiver stations $BTS_n$. In this way it is possible to immediately recognize and locate the cells GSM, DCS and UMTS on the cartographic map 2.

Then, a base transceiver station is selected, in the example the base transceiver station BTS, so as to control the operation of the cells of that selected base transceiver station, in the example cell C.

According to the method of the invention, the amount NUM of traffic generated by mobile terminals MS registered by base transceiver station BTS, in a predefined range of time T and in distinct distance ranges $D_1, D_2, D_3, \ldots D_m$ calculated between the mobile terminals MS and the selected base transceiver station BTS is determined, for at least one of the cells of the selected base transceiver station BTS, in the example cell C.

This allows to obtain the real traffic distribution $NUM_1$, $NUM_2, NUM_3, \ldots NUM_m$ generated by mobile terminals registered by the selected base transceiver station BTS, i.e. the real traffic distribution of cell C of base transceiver station BTS. Values NUM of the amount of traffic can be expressed as absolute values or, preferably, as percentage values. The following is an example of real traffic distribution $NUM_1$, $NUM_2, NUM_3, \ldots NUM_m$ at respective distance ranges $D_1$, $D_2, D_3, \ldots D_m$

TABLE 1

| D | NUM | NUM (%) |
|---|---|---|
| 500 | 12350 | 19 |
| 1000 | 9900 | 22 |
| 1500 | 9000 | 20 |
| 2000 | 4500 | 10 |
| 2500 | 2250 | 5 |
| 3000 | 3600 | 8 |
| 3500 | 6300 | 14 |
| 4000 | 900 | 2 |

Such real traffic distribution $NUM_1, NUM_2, NUM_3, \ldots NUM_8$ of cell C of selected base transceiver station BTS is shown on the cartographic map 2.

Typically, each base transceiver station $BTS_n$ comprises more cells, being each cell identified by a respective antennae. In this case the step of determining the amount NUM of traffic generated by mobile terminals MS registered by the selected base transceiver station BTS is carried out for each cell, so as to obtain the real traffic distribution of each cell of the selected base transceiver station BTS (FIG. 1).

Advantageously, the step of determining the amount NUM of traffic generated by mobile terminals MS registered by the selected base transceiver station BTS comprises the step of getting the timing advance values TA stored at the selected base transceiver station BTS, in a predefined range of time T, for the distinct distance ranges $D_1, D_2, D_3, \ldots D_m$.

Typically, at telephone providers' central offices the timing advance values TA are saved on a daily basis and for each cell $C_n$, for each mobile terminal MS. Such timing advance values are transmitted by mobile terminals MS in predefined ranges of time, specifically every 0.48 sec, if the user is engaged in a telephone conversation.

According to a preferred embodiment, the representation on the cartographic map 2 of the real traffic distribution $NUM_1, NUM_2, NUM_3, \ldots NUM_m$ is achieved by first determining the last value $D_m$ of the distance range $D_1, D_2, D_3, \ldots D_m$ having a value of amount of traffic $NUM_m$ not null, and displaying on the cartographic map 2 a graphic element, for example graphic element 5, according to said last value $D_m$.

Last value $D_m$ of distance range $D_1, D_2, D_3, \ldots D_m$ having a value of amount of traffic $NUM_m$ not null corresponds to the maximum coverage distance of cell C of the selected base transceiver station BTS and represents, as will be better described below, a reference value important for controlling the operation of cell C of base transceiver station BTS and for controlling and optimizing the design of such cell C.

In order to display graphic element 5 according to last value $D_m$ of distance range $D_1, D_2, D_3, \ldots D_m$ having an amount of traffic value $NUM_m$ not null, a pair of Cartesian coordinates are associated to such last value $D_m$ and a graphic element at least matching the pair of Cartesian coordinates of this last value $D_m$ is displayed on the cartographic map 2.

According to this embodiment, the operator can get on the cartographic map 2 the maximum coverage distance of cell C of selected base transceiver station BTS, i.e. the service distance of cell C of selected base transceiver station BTS.

Alternatively, the display of the graphic element according to last value $D_m$ is achieved by displaying a graphic element 5 extending from the pair of Cartesian coordinates of the selected base transceiver station BTS up to the pair of Cartesian coordinates of last value $D_m$ of distance range $D_1, D_2, D_3, \ldots D_m$ having an amount of traffic value $NUM_m$ not null.

According to such embodiment, graphic element 5 comprises a circular sector having its peak in correspondence of the pair of Cartesian coordinates X,Y of selected base transceiver station BTS and angle equal to the angle of opening α of the main antennae lobe 6 associated to cell C of selected base transceiver station BTS.

In particular, the circular sector, in its extension from the pair of Cartesian coordinates X,Y of selected base transceiver station BTS up to the pair of Cartesian coordinates of last value $D_m$ of distance ranges $D_1, D_2, D_3, \ldots D_m$ having an amount of traffic value $NUM_m$ not null is divided into subsectors, each subsector representing a value of distance range D and having a radial extension according to said value of distance range D.

The representation on the cartographic map 2 of the real traffic distribution $NUM_1, NUM_2, NUM_3, \ldots NUM_m$ can be carried out, advantageously, by associating a pair of Cartesian coordinates to each distance range of distance ranges $D_1, D_2, D_3, \ldots D_m$, by associating a graphic element to each value $NUM_i$, with i=1 … m, with of real traffic distribution $NUM_1$, $NUM_2, NUM_3, \ldots NUM_m$ and finally by displaying on the cartographic map 2 the graphic element previously associated to each value $NUM_i$, of real traffic distribution $NUM_1$, $NUM_2, NUM_3, \ldots NUM_m$, in correspondence of the respective pair of Cartesian coordinates.

Advantageously, the graphic element associated to each value $NUM_i$ of real traffic distribution $NUM_1, NUM_2$, $NUM_3, \ldots NUM_m$ represents the value $NUM_i$ itself of the real traffic distribution $NUM_1, NUM_2, NUM_3, \ldots NUM_m$.

Alternatively, such graphic elements can be graphic elements colored in different gradations and/or scale of colors so that a value of the real traffic distribution is associated to each color.

This representation on cartographic map 2 of the real traffic distribution $NUM_1, NUM_2, NUM_3, \ldots NUM_m$, as an alternative or addition to those described above, thus allows to get the real traffic distribution in a certain zone of the coverage area or service area MAP of cell C.

In order to control the correct operation of cell C, the method implies a comparison between the real traffic distribution $NUM_1, NUM_2, NUM_3, \ldots NUM_m$ of cell C of selected base transceiver station BTS and the service area MAP of cell C of selected base transceiver station BTS.

Advantageously, the real traffic distribution $NUM_1, NUM_2, NUM_3, \ldots NUM_m$ of cell C of selected base transceiver station BTS is compared with the best server map 4 of area 3 including service area MAP of cell C.

Such comparison is possible thanks to the displaying of real traffic distribution $NUM_1, NUM_2, NUM_3, \ldots NUM_m$ on the cartographic map 2, not being necessary a contemporary display on the cartographic map 2 of the service area MAP of cell C of selected base transceiver station BTS or of the best server map 4 of area 3.

Advantageously, the method can include the displaying of the service map MAP of cell C or of the best server map 4 of area 3, on the cartographic map 2 displayed on the screen, or on a separate monitor.

The display of the real traffic distribution $NUM_1, NUM_2, NUM_3, \ldots NUM_m$ on the cartographic map 2, allows to associate certain geographic entities with the real traffic distribution $NUM_1, NUM_2, NUM_3, \ldots NUM_m$ of cell C compared with the service area MAP of cell C as identified in the best server map 4 of area 3.

This aspect can be important to detect further eventual environmental elements negatively affecting the reception in a certain area and, therefore, to intervene on the radio design accordingly. For example, the construction of a building or of an architectonic element subsequent the installation of a base transceiver station can cause the interruption of signal in the surrounding area. This event can be immediately detected on the cartographic map 2 by the presence of a sudden extremely law value of the amount NUM of traffic registered by cell C of the selected base transceiver station BTS, at distances greater than that of the building.

Controlling the operation of cell C through the method of the present invention, specifically allows to control and optimize the design of cell C and to detect failures of cell C.

Possible failures or behaviours differing from the theoretical forecast of a cell C of a base transceiver station BTS can be due to:
  a wrong position of the antennae, i.e. a displacement of the antennae from its axis due to external events, such as atmospheric events, for example strong wind, or structural problems, for example the loosening of clamping means and the like,
  a wrong modelling of the territory i.e. the geographic area on electronic and computer processing devices used to design the cells in the preliminary step; in reference to this it is useful to outline that the urban tissue of the territory continuously evolves and its representation on design tools represent a model with consequent precision limits.

Such events determine a real traffic distribution $NUM_1, NUM_2, NUM_3, \ldots NUM_m$ on cartographic map 2 for cell C of selected base transceiver station BTS different from service area MAP of best server map 4.

Displaying the real traffic distribution $NUM_1, NUM_2, NUM_3, \ldots NUM_m$ on the cartographic map 2 allows, for example to an operator in charge of controlling area 3 of the cellular communication system 1, to detect differences between the service distance of the antennae associated to cell C of the selected base transceiver station BTS and the service distance forecasted on the base of the service area MAP of best server map 4.

In these cases it is therefore necessary to verify the correct installation of the antennae i.e. to review the radio design coherently with the real traffic distribution $NUM_1, NUM_2, NUM_3, \ldots NUM_m$.

Another example of application of the method for controlling the operation of a cell of a cellular communication system according to the present invention is the definition of the cells proximity plan.

During the design step, thus relying on the best server coverage maps, a list of adjacent cells is defined for each cell of a base transceiver station. This list comprises the totality of cells with which a mobile terminal exiting the serving cell can communicate without having to interrupt the conversation, commonly called handover procedure.

The correct planning of this list is a key factor for designing the correct operation of a cellular communication system in the presence of mobile terminals. The starting point for the definition of this list is based on the theoretical best server coverage map by analysing all the possible cells with contact points between them. When the base transceiver station is installed and put into operation, there arises the problem of controlling the correct definition of this list in order to avoid inconveniences to users such as the lack of coverage with consequent interruption of the conversation caused by the lack of even one cell in the totality of adjacent cells. The representation on cartographic map 2 of real traffic distribution $NUM_1, NUM_2, NUM_3, \ldots NUM_m$ thus allows to get the real traffic distribution in a certain zone of the coverage area of cell C and specifically to compare it with the real traffic distributions of all the cells of the area, pointing out further contact points between the cells not shown in the preliminary design step, on the base of the theoretical best server coverage maps. These further points of contact allow to optimize the design of the adjacent cells list.

According to a preferred embodiment, the method according to the invention is implemented through an electronic system comprising an electric processor unit able to receive the data related to the amount of traffic generated by the mobile terminals registered by the various base transceiver stations, to save such data and to process such data in order to determine the real traffic distribution, a displaying screen to display the cartographic map with the base transceiver stations, the cells, the relevant graphic elements and the real traffic distribution and, eventually, the best server map.

As it can be appreciated from the above description, the method for controlling the operation of a cell of a cellular communication system according to the present invention allows to satisfy the above mentioned needs and to avoid, at the same time, the inconveniencies referred to in the introduction of the present description with reference to the known art.

Specifically, the method according to the invention allows to control the operation of a cell of a cellular communication system without having to depend on the randomness of periodic assistance controls and/or complaints due to inconveniences caused to the clientele for a constant lack of coverage in a certain area. The method according to the invention also allows to control and optimize the design of the cells and to detect eventual failures of the cells or behaviours differing from the theoretical forecast.

Moreover, the method according to the invention allows to find out further eventual points of contact between the cells not detected in the preliminary design step, according to the service area of the best server map. These further points of contact allow to optimize the design of the adjacent cells list.

Obviously, those skilled in the art, in order to satisfy contingent and specific needs, will be able to make many changes and alterations to the method described above, all however embedded in the protection scope as defined by the following claims.

The invention claimed is:

1. A method for controlling the operation of the cells of a cellular communication system, said method comprising the steps of:
    displaying on a screen a cartographic map of a geographic area comprising a plurality of base transceiver stations, each base transceiver station being intended to serve one or more cells each having a respective service area,
    associating a pair of Cartesian coordinates and a graphical element to each base transceiver station,
    displaying on said cartographic map the graphical element of each base transceiver station in correspondence to the respective pair of Cartesian coordinates,
    selecting a base transceiver station,
    determining, for at least one of the cells of the selected base transceiver station, the amount of traffic generated by mobile terminals registered by said base transceiver station, in a predefined range of time, in distinct distance ranges between said mobile terminals and said selected base transceiver station so as to obtain the real traffic distribution of said at least one cell, determining a last value of said distance ranges having a value of the amount of traffic not null,
    displaying on said cartographic map a second graphical element according to said last value of the distance ranges having a value of the amount of traffic not null, the second graphical element being associated with a second pair of Cartesian coordinates, the second graphical element having a circular sector having its peak in correspondence with the pair of Cartesian coordinates of the selected base transceiver station, an area generally equal to $\pi D_N^2/J$, and an angle equal to an angle of opening of a main antennae lobe associated with said at least one cell of the selected base transceiver station, and
    comparing said real traffic distribution of said at least one cell with the service area of said at least one cell, wherein $D_N$ is said last value of said distance ranges and J is the number of cells served by the selected base transceiver station.

2. A method according to claim 1, further comprising:
    displaying the second graphical element as extending from the pair of Cartesian coordinates of said selected base transceiver station up to the second pair of Cartesian coordinates of said last value of the distance ranges.

3. A method according to claim 2, in which said second graphical element, in its extension from the pair of Cartesian coordinates of the selected base transceiver station up to the second pair of Cartesian coordinates of the last value of the distance ranges having a value of the amount of traffic not null is divided into subsectors, each subsector representing a value of distance range and having a radial extension according to said value of distance range.

4. A method according to claim 1, in which said selected base transceiver station operates in a plurality of cells, said step of determining the amount of traffic generated by mobile terminals registered by said selected base transceiver station is carried out for each cell of said plurality of cells, so as to obtain the real traffic distribution for each cell of said selected base transceiver station.

5. A method according to claim 4, in which said step of comparing said real traffic distribution of said at least one cell with the service area of said at least one cell is carried out for each cell of said selected base transceiver station.

6. A method according to claim 1, further comprising:
    associating a pair of Cartesian coordinates to each distance range of the distance ranges,
    associating a graphical element to each value of said real traffic distribution,
    displaying on the cartographic map the graphic element associated to each value of the real traffic distribution matching the respective pair of Cartesian coordinates.

7. A method according to claim 1, in which said step of determining the amount of traffic generated by mobile terminals registered by the selected base transceiver station comprises the step of measuring the timing advance values stored in said selected base transceiver station, in a predefined range of time, for the distinct distance ranges.

8. A method according to claim 1, in which the service areas of the cells of the area identify a theoretical coverage map of said geographical area.

9. A method according to claim 8, in which said theoretical coverage map is the best server map of said area.

10. A method according to claim 8, in which said theoretical coverage map is defined by identifying, point to point within said area, the cell whose base transceiver station is able to provide the stronger signal.

11. A method according to claim 8, in which said real traffic distribution of said at least one cell is compared with the theoretical coverage map of said area.

12. A method according to claim 1, in which the graphic elements of the base transceiver stations are selected according to the transmission frequencies of the base transceiver stations.

13. A method according to claim 12, in which to the graphic elements of the base transceiver stations respective colors are associated according to the transmission frequency of the respective base transceiver stations.

* * * * *